UNITED STATES PATENT OFFICE.

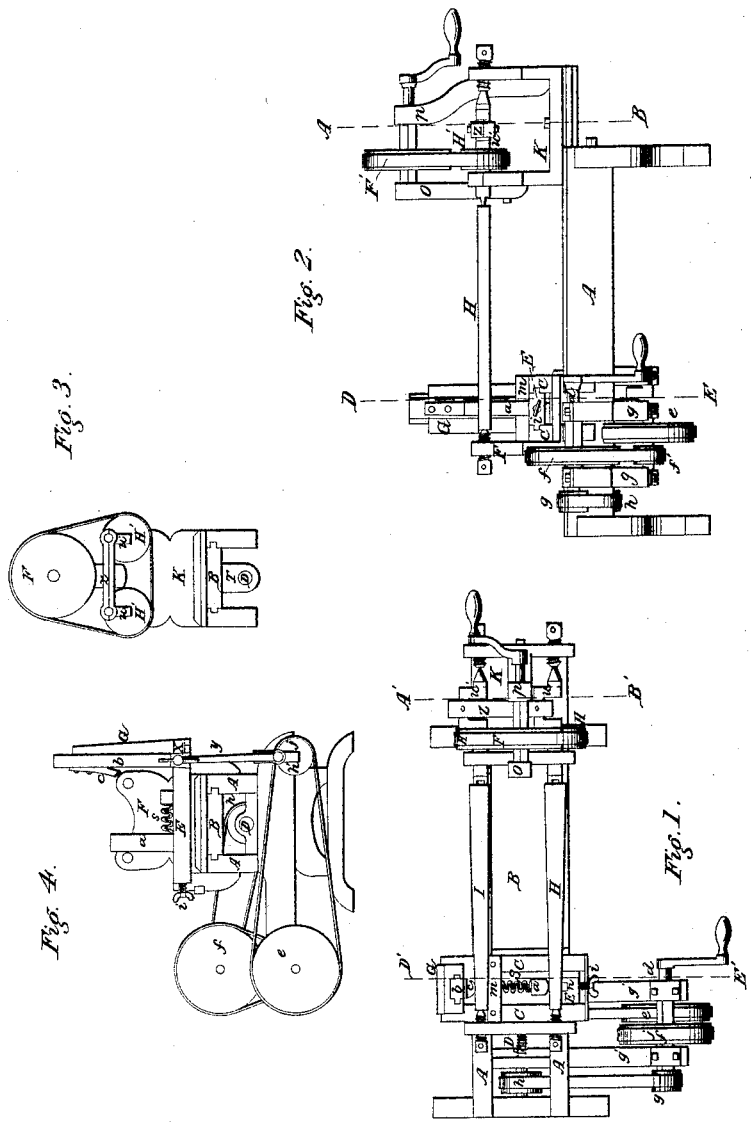

DECATUR WERST AND AARON PUDERBAUGH, OF WALTZ TOWNSHIP, WABASH COUNTY, INDIANA.

LATHE FOR TURNING IRREGULAR FORMS.

Specification of Letters Patent No. 27,178, dated February 14, 1860.

*To all whom it may concern:*

Be it known that we, DECATUR WERST and AARON PUDERBAUGH, of Waltz township, in the county of Wabash and State of Indiana, have invented a new and useful Machine for Turning Irregular Forms; and we do hereby declare that the following is a full, clear, and exact description of the construction and operation of the same, reference being had to the annexed drawings, making a part of this specification, in which—

Figure 1, is a horizontal plan. Fig. 2, is a longitudinal elevation; Fig. 3, a transverse section on the line A', B', Figs. 1 and 2; Fig. 4, a transverse section on the line D', E' Figs. 1 and 2.

Similar letters of reference indicate corresponding parts in the several figures.

The nature of our invention consists in the combination of the vertically reciprocating cutter with the longitudinally traveling carriage, and the laterally sliding gage, by means substantially as hereinafter specified.

By our combination, in turning pieces which are broad at one end or similar in form to spokes, we can cut or turn nearer to the form of the pattern than can be accomplished with those combinations which employ a revolving cutter, because our vertically reciprocating cutter cuts the entire width at one stroke and that too at a point, *i. e.* the broad end, where no revolving cutter can cut an article or spoke to the desired shape. That this is a very great desideratum in spoke cutting no one acquainted with irregular turning will deny.

It may be supposed by those not practically acquainted with irregular turning that a disadvantage is experienced from not being able to run the vertical cutter with the same velocity as the revolving cutter moves; but this is not the case, because the vertical cutter cuts the same thickness throughout its stroke; whereas the revolving cutter cuts the deepest from its center to the center of the piece being turned; and therefore if we lose in speed we gain in the thickness of the cut.

A is the shear or frame, B is a sliding bed to which is attached the head-blocks F, and K, the timbers C, C, are stationary guards, fixed transversely upon the shear A, and is made with a groove-track, into which the slide E, works laterally by the motion of the pattern, H, and spiral spring S. The uprights G, and *a*, are attached to the slide E; *c*, is the cutter; *b*, is the cutter shaft which works vertically in the upright G, by the shafts, Y, J. The timbers *m*, are bolted to the timbers C, for the purpose of securing the spring *s*. The upright *a*, is movable in the slot *n*, and adjusted by the set-screw *i*. The timbers *g'*, *g'*, are fastened to the under side of the shear A, and supports the wheels, *e*, *f*, *g*. The feed-screw D, works through the nut T, Fig. 3. The upright shaft *y*, is attached to the cutter shaft *b*, by the working joint *x*, the lower end is connected with the crank J, Fig. 4, the small wheel *h'*, is attached to the crank and run by a belt from the wheel *e*. The wheel *h*, is attached to the feed-screw D, and driven by belt from pulley wheel *g*. The uprights *o*, *p*, support the wheel F'. The two small wheels H', H' are fixed on the shafts *u*, *u*, and run by a belt from the wheel F'. The shafts *u*, *u*, are each made with cranks, and connected with a connecting rod *z*, which equalizes the motion of the pattern, and the piece to be turned.

In operating with our machine the piece I to be turned, and the patterns H, are fixed into the lathe, and the gage-post *a*, is adjusted by the set-screw *i*, so as to turn the pieces either larger, or smaller, than the pattern, the motion is then communicated from the driving *f*, to the crank-wheel *h'*, which gives a rapid motion to the vertical cutter, *c*. The pattern and piece are revolved together, by a belt running from the driving wheel F', around the two small crank-wheels H', H', and the connecting, or, parallel rod *z*. We consider that this machine possesses many advantages, the simplicity of its construction, the small power required in running it, and the ease with which it can be applied to any common wood lathe.

What we claim as our invention and desire to secure by Letters Patent, is—

The combination of the vertically reciprocating cutter *c*, with the longitudinally traveling carriage B, and laterally sliding gage E, by the means, and in the manner substantially as herein described; for the purpose set forth.

DECATUR WERST.
AARON PUDERBAUGH.

Witnesses:
DILLARD KASS,
R. C. WEBB.